United States Patent
Seo

(10) Patent No.: US 9,658,748 B2
(45) Date of Patent: May 23, 2017

(54) SYSTEM AND METHOD OF MANAGING STATES OF COMPUTER SCREEN AND CONTROLLING MOBILE COMMUNICATION TERMINAL

(71) Applicant: RSUPPORT CO., LTD., Seoul (KR)

(72) Inventor: Hyungsu Seo, Gyeonggi-do (KR)

(73) Assignee: RSUPPORT CO., LTD., Seoul (KR)

( * ) Notice: Subject to any disclaimer, the term of this patent is extended or adjusted under 35 U.S.C. 154(b) by 284 days.

(21) Appl. No.: 13/709,906

(22) Filed: Dec. 10, 2012

(65) Prior Publication Data
US 2013/0179825 A1    Jul. 11, 2013

(30) Foreign Application Priority Data
Jan. 10, 2012  (KR) .......................... 10-2012-0002773

(51) Int. Cl.
| G06F 3/048 | (2013.01) |
| G06F 3/0484 | (2013.01) |
| G06F 3/14 | (2006.01) |
| H04L 29/08 | (2006.01) |
| G06F 9/44 | (2006.01) |

(52) U.S. Cl.
CPC .............. *G06F 3/0484* (2013.01); *G06F 3/14* (2013.01); *G06F 3/1423* (2013.01); *G06F 3/1454* (2013.01); *G06F 9/4445* (2013.01); *H04L 67/025* (2013.01); *G06F 9/4418* (2013.01)

(58) Field of Classification Search
CPC .... G06F 3/0484; G06F 3/1454; G06F 3/1423; G06F 3/14; G06F 9/4418; G06F 9/4445; H04L 67/025
See application file for complete search history.

(56) References Cited

U.S. PATENT DOCUMENTS

| 8,412,798 | B1* | 4/2013 | Wang ........................... 709/217 |
| 2007/0049238 | A1* | 3/2007 | Chen .......................... 455/343.1 |
| 2011/0246757 | A1* | 10/2011 | Prakash et al. .................... 713/2 |
| 2011/0257958 | A1* | 10/2011 | Kildevaeld ...................... 703/23 |
| 2012/0213134 | A1* | 8/2012 | Woo et al. ..................... 370/311 |
| 2012/0213135 | A1* | 8/2012 | Woo et al. ..................... 370/311 |
| 2012/0213136 | A1* | 8/2012 | Woo et al. ..................... 370/311 |
| 2012/0214417 | A1* | 8/2012 | Woo et al. .................... 455/41.2 |
| 2013/0290882 | A1* | 10/2013 | Cotte ............................ 715/764 |

FOREIGN PATENT DOCUMENTS

| KR | 10-2004-0102623 A | 12/2004 |
| KR | 10-2010-0033260 A | 3/2010 |
| KR | 10-2010-0091814 A | 8/2010 |
| KR | 10-1066853 B1 | 9/2011 |

* cited by examiner

*Primary Examiner* — William Bashore
*Assistant Examiner* — James F Sugent
(74) *Attorney, Agent, or Firm* — Mintz Levin Cohn Ferris Glovsky and Popeo, P.C.; Kongsik Kim; Jonathon Western

(57) ABSTRACT

Disclosed is a mobile communication terminal including a touch screen as an input and output means is controlled by a processor on a computer as a mobile station of a mobile communication network, and screen information is output through the display of the mobile communication terminal. A screen display unit of the computer switches to a sleep mode corresponding to the sleep mode of the mobile communication terminal, and the sleep mode of the mobile communication terminal is disabled by manipulating the computer. Accordingly, erroneous manipulation can be prevented in the control process.

4 Claims, 10 Drawing Sheets

SYSTEM AND METHOD OF MANAGING STATES OF COMPUTER SCREEN AND CONTROLLING MOBILE COMMUNICATION TERMINAL

CROSS-REFERENCE TO RELATED APPLICATIONS

The application claims priority to Korean Patent Application No. 10-2012-0002773 filed on Jan. 10, 2012, which is incorporated herein by reference.

BACKGROUND

1. Technical Field

In the present invention, a mobile communication terminal having a touch screen as an input and output means is controlled by a computer as a mobile station of a mobile communication network, and screen information is output through a screen display unit of the mobile communication terminal implemented on the screen of the computer. The screen display unit of the computer switches to a sleep mode when the display of the mobile communication terminal switches to a sleep mode, and the mobile communication terminal can be powered back on by manipulating the computer.

2. Related Art

As illustrated in FIG. 3, with the advancement in the mobile communication technology, communication methods limited to voice communications or short message services (SMS) have evolved into Internet connections through mobile communication networks 21 based on communication protocols, such as the wireless application protocol (WAP) or the like. As high-functional mobile communication terminals 10 having input and output devices such as a high-resolution touch screen, and a high-performance control and operation device and a memory device, are distributed through the mobile communication networks 21, high-resolution image processing and execution of various application programs supporting multimedia, and Internet connections based on TCP/IP (Transport Control Protocol/Internet Protocol) through a wireless LAN 22, are enabled.

The high-functional mobile communication terminals 10, referred to as a smart phone, use a high resolution touch screen and a related control and operation device, and thus a graphic user interface (GUI) comparable to that of a desktop computer 41 and a conventional keypad type device is implemented. Accordingly, user convenience has been improved in manipulation of the mobile communication terminals 10, and application programs capable of performing various tasks can be installed and executed in the mobile communication terminals 10 based on the improvement of control and operation capability and memory capacity.

Particularly, as Internet connections of the high-functional mobile communication terminals 10 through the mobile communication networks 21 and the wireless LANs 22 are generalized and social networking services (SNS) continue to expand, exchange of information increases among users of mobile communication terminals 10. In addition, as the mobile communication terminals 10 use functions beyond the conventional functions (e.g., limited to communication devices) and evolve into a multimedia device or a portable computer 41, the number of users voluntarily providing or exchanging various kinds of information through the Internet based on the functions and portability of the mobile communication terminals 10 increases.

In addition, since convenience, functions and user interfaces for manipulating the mobile communication terminals 10, and processing capacity of hardware and operating systems, are becoming increasingly advanced compared to conventional methods, it is possible to create and read various types of electronic documents and process multimedia data. Accordingly, qualitative and quantitative expansion of information that is processed continues to increase.

Therefore, as shown in FIG. 1, techniques for establishing a session between a mobile communication terminal 10 and a computer 41, controlling the mobile communication terminal 10 through the computer 41, and distributing data between the mobile communication terminal 10 and the computer 41 have been developed to increase the efficiency of mobile communication terminal 10 use.

Control of the mobile communication terminal 10 through the computer 41 is performed by a computer control program installed on the computer 41 and a mobile control program installed on the mobile communication terminal 10, and both the control programs can be modularized into an operating system or installed as an application program.

When the control program of the computer 41 is executed, a screen display unit 50 is implemented on the screen of the computer 41 as shown in FIG. 1 while a session is established between the computer 41 and the mobile communication terminal 10, and the output on the display of the mobile communication terminal 10 is output on the screen display unit 50. A user of the computer 41 may manipulate the mobile communication terminal 10 through the screen display unit 50 controlled by the computer control program using an input device such as a mouse or the like and may perform a task similar to directly manipulating the mobile communication terminal 10, such as copying information stored in the mobile communication terminal 10 onto the computer 41 or capturing an image output on the display of the mobile communication terminal 10.

The session between the mobile communication terminal 10 and the computer 41 can be established in a variety of methods, and representative examples are shown in FIGS. 2 and 3.

FIG. 2 shows the mobile communication terminal 10 and the computer 41 directly connected through a USB (Universal Serial Bus) or the like. The mobile communication terminal 10 operates as a USB device, and the computer 41 operates as a USB host. In particular, the control program installed on the computer 41 can be a USB system program or a USB client device driver embedded in the operating system.

The direct connection between the mobile communication terminal 10 and the computer 41 as shown in FIG. 2 is applied when a mobile communication terminal 10 user directly connects the mobile communication terminal 10 to a computer 41 and performs a task such as transferring or updating data. However it is not limited to a direct connection as shown in the figure, but includes different types of short range wireless communication methods such as Bluetooth, Zigbee and the like.

FIG. 3 shows the mobile communication terminal 10 and the computer 41 connected through a wireless network 20 and the Internet. As shown in the figure, the wireless network 20 refers to the mobile communication network 21 of a TDMA (Time Division Multiple Access) or a CDMA (Code Division Multiple Access) scheme and the wireless LAN 22 such as a Wi-Fi (Wireless-Fidelity) or WiBro (Wireless Broadband) network for performing communication based on a TCP/IP (Transport Control Protocol/Internet Protocol). The wireless LAN 22 and the mobile communication network 21 are respectively connected to the Internet through a gateway server 31 and a communication company server 32, which can be referred to as a gateway server, and the computer 41 connected to the Internet controls the mobile communication terminal 10.

The connection between the mobile communication terminal 10 and the computer 41 through the Internet as shown in FIG. 3 is applied when a remote control customer service is provided. The remote control customer service is provided by a communication company which attracts controlled mobile communication terminals 10 as subscribers or an Internet information providing company which distributes paid data or application programs in association with the wireless network 20, and a user of the computer 41 can be a call center agent of the communication company or the Internet information providing company.

SUMMARY

When a computer control program and a mobile control program are respectively installed on a computer 41 and a mobile communication terminal 10 the programs may be executed while connecting the mobile communication terminal 10 and the computer 41 as described above, the mobile communication terminal 10 may be controlled by the computer 41. Specifically, the computer control program may transmit a manipulation command to the mobile control program and the mobile control program may receive and input the manipulation command into the operating system of the mobile communication terminal 10 and transmit screen information to the computer control program. Generally, the screen display unit 50 may be implemented on the screen of the computer 41 as shown in FIG. 1, and an image output on the display of the mobile communication terminal 10 may be output on the screen display unit 50 of the computer 41.

FIG. 4 is an exemplary view showing a mobile communication terminal 10 controlled by a computer 41 according to a conventional technique. As shown in the figure, although the display of the mobile communication terminal 10 is switched to a sleep mode, the screen display unit 50 of the computer 41 maintains an image displayed before the sleep mode is enabled.

The mobile communication terminal 10 having a touch screen as an input and output means may switch the display into a sleep mode when there is no input for a predetermined time period through the touch screen or a key button. Furthermore, the sleep mode is a mode in which operation of the display may be stopped by disabling the power supplied to the display or the power of the backlight disposed on a back of the display may be disabled.

It may be possible to suppress unnecessary consumption of power and extend the lifespan of the display hardware by switching the display of the mobile communication terminal 10 into the sleep mode. However, as shown in FIG. 4, when the mobile communication terminal 10 is controlled by the computer 41, although the display of the mobile communication terminal 10 is switched to sleep mode, the computer control program installed on the computer 41 does not reflect the sleep mode, and the screen display unit 50 may maintain an image displayed before the sleep mode is enabled, and thus the mobile communication terminal 10 may not be controlled efficiently, and erroneous manipulation of the mobile communication terminal 10 may occur.

Transition into the sleep mode of the display of the mobile communication terminal 10 may stop operation of the display by the operating system of the mobile communication terminal 10 when there is no input for a predetermined time period through the hardware such as the touch screen or a key button. Therefore, when the mobile communication terminal 10 is controlled by the computer 41 and an input does not occur through the hardware of the mobile communication terminal 10, the display of the mobile communication terminal 10 may switch to the sleep mode in a control process. In addition, transition to the sleep mode may not change an image output on the display, but may stop the operation of the hardware. Thus, since screen information that the computer control program receives may not change, the computer control program may not determine a transition to the sleep mode.

The transition to the sleep mode may occur while controlling the mobile communication terminal 10 by the computer 41 and may generate a problem when the computer 41 at a remote site remotely controls the mobile communication terminal 10 through the Internet and the wireless network 20 as shown in FIG. 3.

In other words, as shown in FIG. 3, establishing a session between the mobile communication terminal 10 and the computer 41 may be performed when a call center agency of a communication company or an Internet information providing company provides a remote control service using a computer 41 to the mobile communication terminal 10. In particular, the computer 41 user may not visually confirm the display of the controlled mobile communication terminal 10, and thus although the controlled mobile communication terminal 10 is switched to the sleep mode, the agency may not determine a sleep mode and may perform the remote control, thereby causing an erroneous manipulation of the mobile communication terminal 10.

Particularly, when the user of the mobile communication terminal 10 inputs personal information or authentication information during the remote control through the Internet and the wireless network 20, and when the agent performing the remote control while the display of the mobile communication terminal 10 is in a sleep mode, the agent may not detect the sleep mode and may erroneously manipulate the mobile communication terminal 10 Furthermore, since the agent may also aid a user in operating the mobile communication terminal 10, the agent must determine a sleep mode of the mobile communication terminal 10 to prevent erroneous manipulation.

Accordingly, the present invention provides a method of controlling a plurality of screen states of a computer and a controlled mobile communication terminal, in which a computer control program installed on the computer 41 for controlling the mobile communication terminal 10 may detect a sleep mode of the display of the mobile communication terminal 10, and the computer control program may disable the sleep mode of the display of the mobile communication terminal 10.

According to one embodiment of the present invention, a method of controlling a screen state of a mobile communication terminal including a touch screen as an input and output means through a computer 41, may include: executing a mobile control program and a computer control program respectively installed on the mobile communication terminal 10 and the computer 41, and establishing a session between the mobile communication terminal 10 and the computer 41; transmitting a sleep signal to the computer 41 by the mobile control program, when an operating system of the mobile communication terminal 10 switches a display of the mobile communication terminal 10 to a sleep mode;

and switching a screen display unit 50 of the computer 41 to a sleep mode by the computer control program receiving the sleep signal.

According to another embodiment of the present invention, a method of controlling a screen state of a mobile communication terminal including a touch screen as an input and output means through a computer 41, may include: executing a mobile control program and a computer control program respectively installed on the mobile communication terminal 10 and the computer 41, and establishing a session between the mobile communication terminal 10 and the computer 41; transmitting a sleep signal to the computer 41 by the mobile control program, when an operating system of the mobile communication terminal 10 switches a display of the mobile communication terminal 10 to a sleep mode; switching a screen display unit 50 of the computer 41 to a sleep mode and setting a sensing area 51 on the screen display unit 50 by the computer control program of the computer 41 receiving the sleep signal; transmitting a restoration signal to the mobile communication terminal 10 by the computer control program, when a manipulation is sensed in the sensing area 51 of the screen display unit 50 of the computer 41; and inputting a manipulation signal into the operating system of the mobile communication terminal 10 and operating the display of the mobile communication terminal 10 by the mobile control program of the mobile communication terminal 10 receiving the restoration signal. In addition, a skin 55, which is an image of an outer appearance of the mobile communication terminal 10, may be included in the screen display unit 50, and the sensing area 51 may be set in the skin 55.

Figure 1:
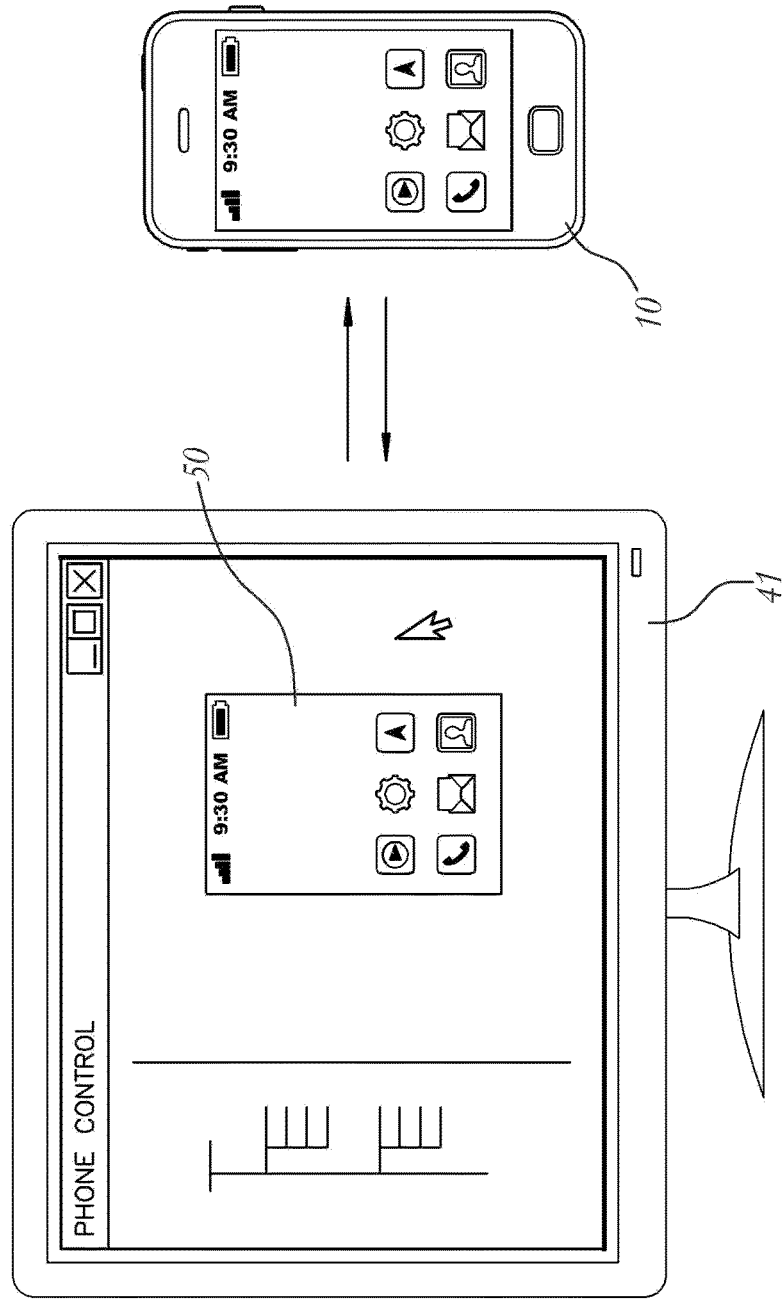
FIG. 1 is an exemplary view showing a control state of a mobile communication terminal controlled by a computer, according to the prior art.

| SYMBOLS USED IN THE DRAWINGS | |
|---|---|
| 10: Mobile communication terminal | 20: Wireless network |
| 21: Mobile communication network | 22: Wireless LAN |
| 31: Gateway server | 32: Communication company server |
| 41: Computer | 50: Screen display unit |
| 51: Sensing area | 55: Skin |

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, detailed configuration and processing procedures of the present invention will be given with reference to the accompanying drawings.

Figure 5:
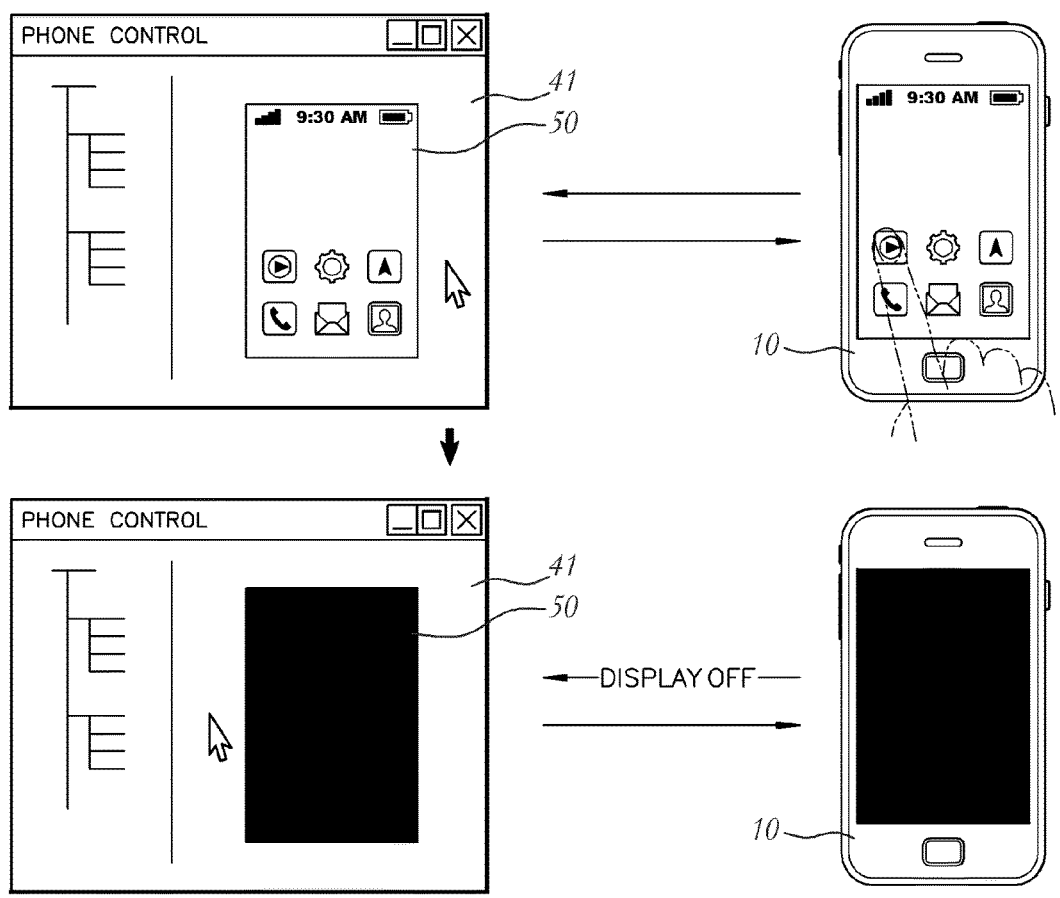
FIG. 5 is an exemplary view showing a mobile communication terminal controlled by a computer, according to an exemplary embodiment of the present invention.

First, FIG. 5 is an exemplary view showing a mobile communication terminal 10 controlled by a computer 41 according to an exemplary embodiment of the present invention. As shown in the figure, when the mobile communication terminal 10 is not manipulated for a predetermined time period while the mobile communication terminal 10 is controlled by the computer 41, the display of the mobile communication terminal 10 may switch to a sleep mode, and a screen display unit 50 of the computer 41 may also turn into a sleep mode.

Figure 6:
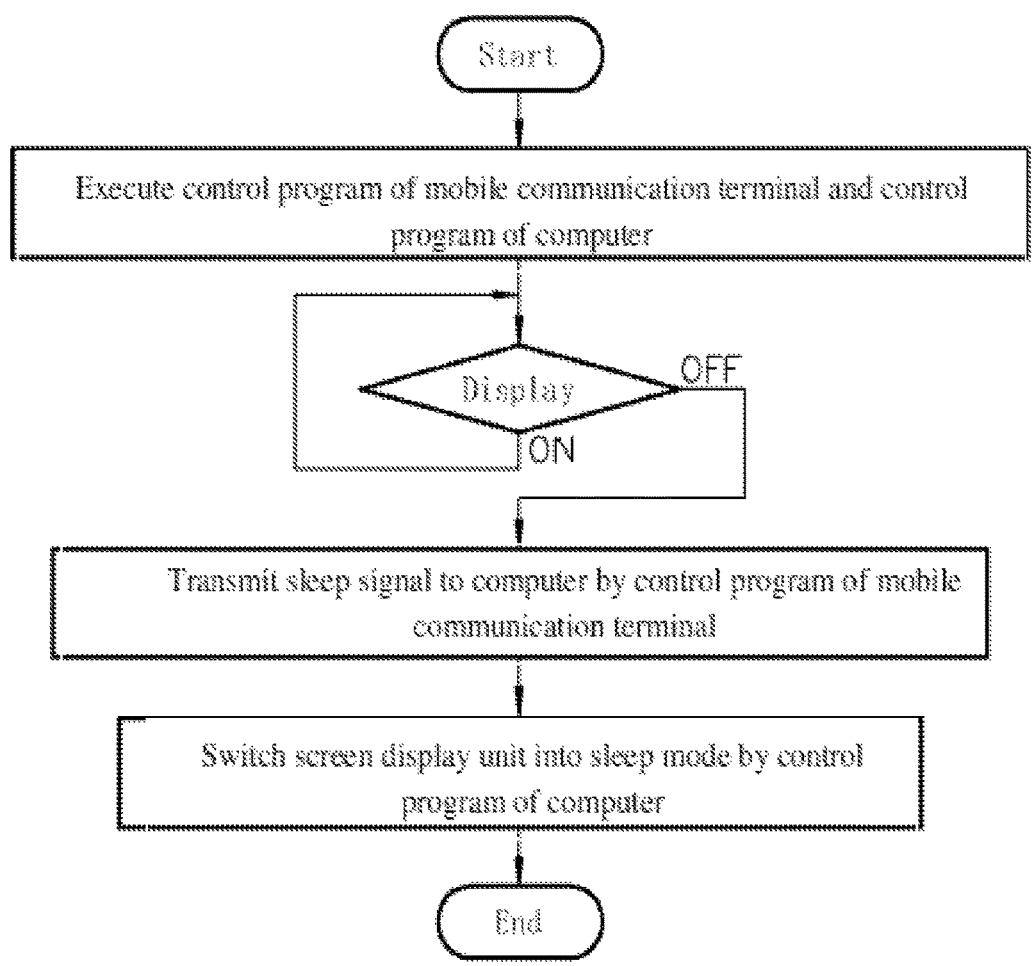
FIG. 6 is an exemplary flowchart, according to an exemplary embodiment of the present invention.

The sleep mode of the display of the mobile communication terminal 10 may be associated with the sleep mode of the screen display unit 50 of the computer 41 which controls the mobile communication terminal 10 through a mobile control program and a computer control program respectively installed on the mobile communication terminal 10 and the computer 41, and the control procedure is shown in FIG. 6.

In other words, the present invention may be performed when the mobile communication terminal 10 is controlled by the computer 41. As shown in FIG. 6, the mobile control program and the computer control program respectively installed on the mobile communication terminal 10 and the computer 41 may be executed, and a session may be established between the mobile communication terminal 10 and the computer 41.

Figure 2:
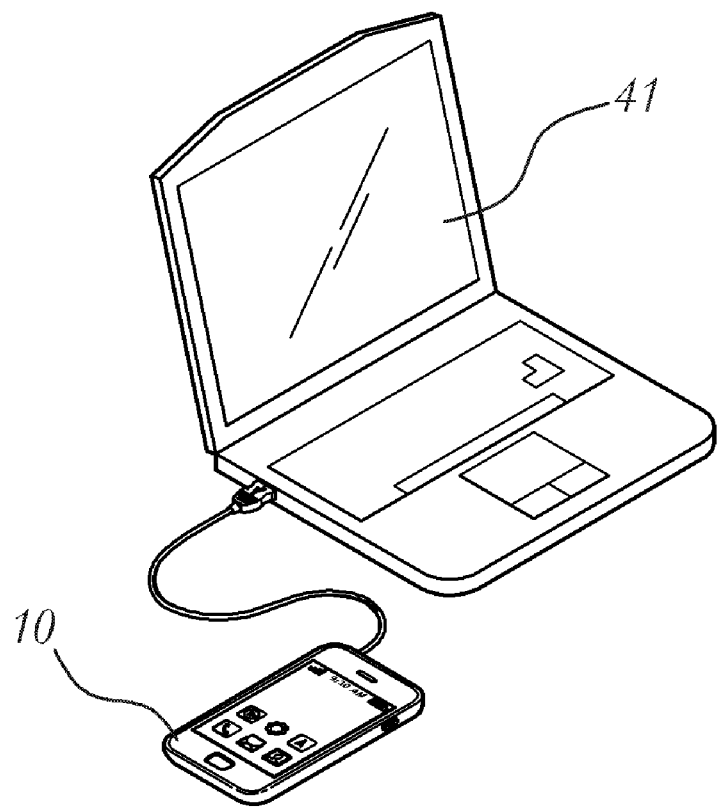
FIG. 2 is an exemplary view showing a method of direct connecting a computer and a mobile communication terminal, according to the prior art.
Figure 3:
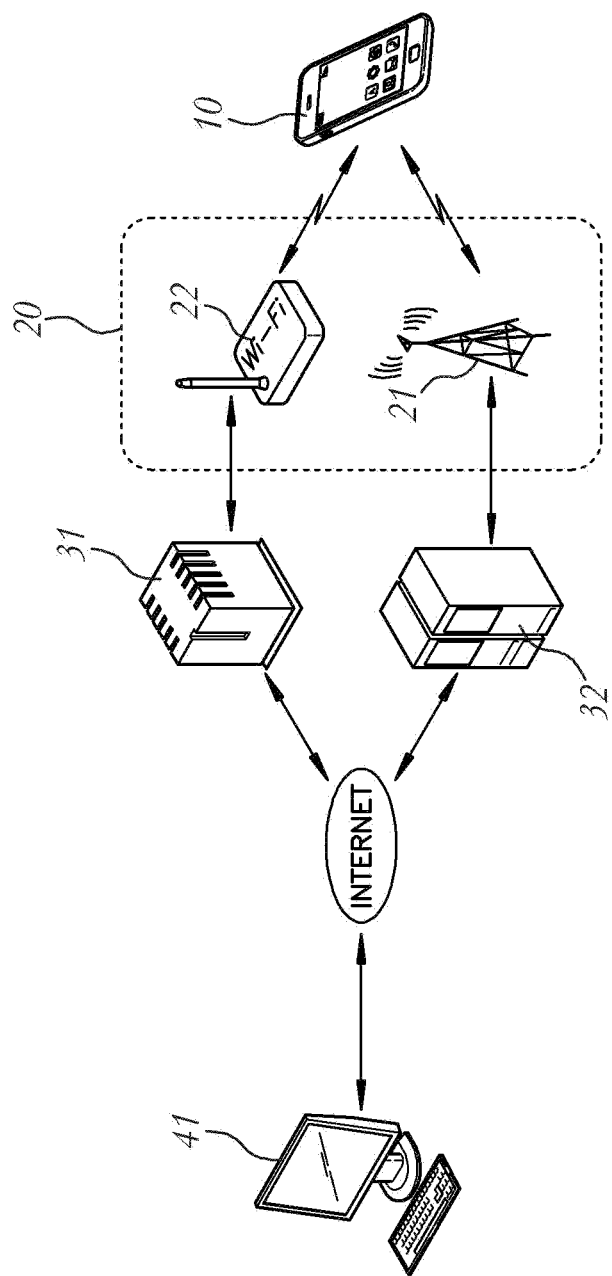
FIG. 3 is an exemplary view showing a method of connecting a computer and a mobile communication terminal through the Internet and a wireless network, according to the prior art.
Figure 4:
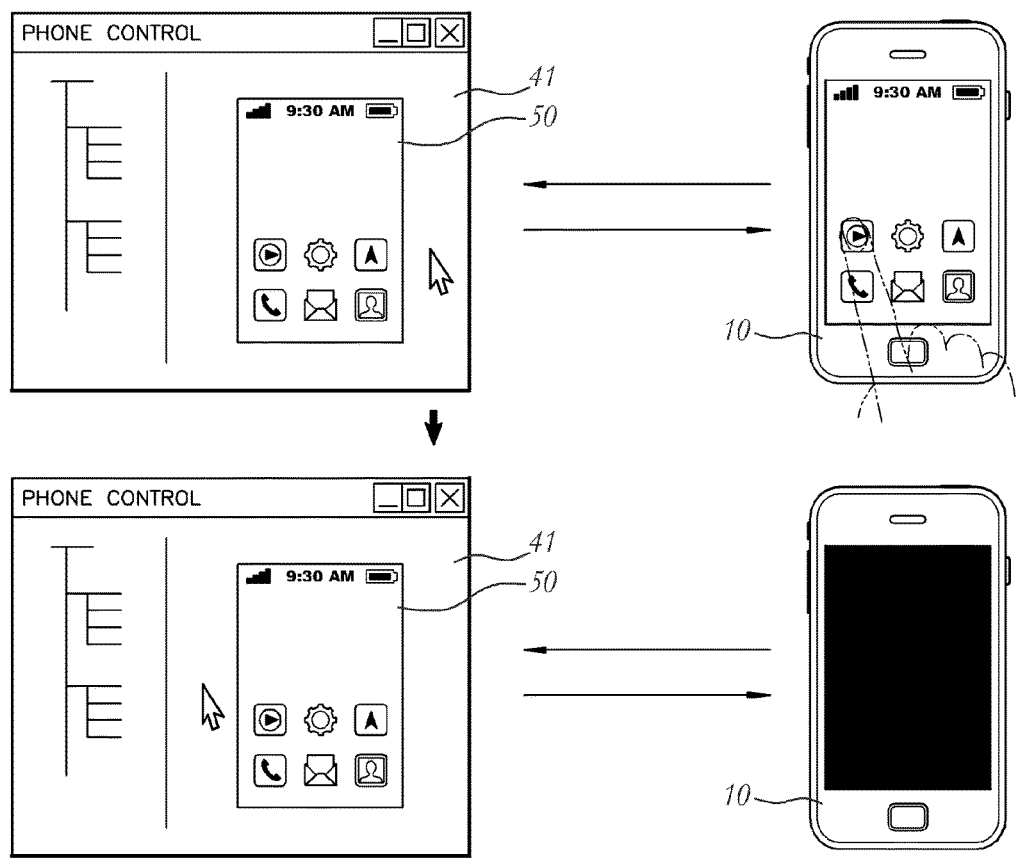
FIG. 4 is an exemplary view showing a mobile communication terminal controlled by a computer, according to a prior art method.

The method of establishing a session between the mobile communication terminal 10 and the computer 41 may be classified into a method of directly connecting the mobile communication terminal 10 and the computer 41 through a USB or the like as shown in FIG. 2 and a method connecting the mobile communication terminal 10 and the computer 41 through a wireless network 20 and the Internet as shown in FIG. 3. In establishing the session, there may be a difference in the physical structure of the connection, but the logical configuration may be the same since communications may be performed between the control program installed on the computer 41 and the controlled program mounted on the mobile communication terminal 10.

In the method directly connecting the computer 41 and the mobile communication terminal 10 shown in FIG. 2, the control program installed on the computer 41 may be a USB system program or a USB client device driver embedded in the operating system, and the mobile control program installed on the mobile communication terminal 10 may be a program module or an application program embedded in the operating system of the mobile communication terminal 10 communicating with the computer control program. The method of establishing a connection through the Internet as shown in FIG. 3 may be applied when a communication company or an Internet information providing company provides a remote control customer service, wherein the computer control program and the mobile control program may be a remote control program installed in the computer 41 and the mobile communication terminal 10.

When the mobile control program and the computer control program respectively installed on the mobile communication terminal 10 and the computer 41 are executed by a processor and a session is established between the mobile communication terminal 10 and the computer 41, the screen display unit 50 for outputting the screen information output on the display of the mobile communication terminal 10 may be implemented on the screen of the computer 41 as shown in the upper figure of FIG. 5, by extracting an image output on the display and transmitting the extracted image to the computer control program through the mobile control program of the mobile communication terminal 10.

When the mobile communication terminal 10 is not manipulated directly for a predetermined time period while the session is established between the computer 41 and the mobile communication terminal 10 and the mobile communication terminal 10 is controlled by the computer 41 as described above, the display of the mobile communication terminal 10 may be switched to a sleep mode by disabling the power of the entire display or the backlight disposed on a back of the display by the operating system of the mobile communication terminal 10. Furthermore, the mobile control program of the mobile communication terminal 10 may sense the sleep mode and transmit a sleep signal to the control program of the computer 41.

Transition of the display into the sleep mode by the operating system of the mobile communication terminal 10 may not change the image information output on the display, but may control the operating state of display hardware. Thus, in the conventional method, the mobile control program of the mobile communication terminal 10 does not consider the sleep mode and maintains an image displayed right before the transition to the sleep mode, and accordingly, the screen display unit 50 of the computer 41 does not reflect the sleep mode of the display of the mobile communication terminal 10. However, in the present invention, the mobile control program may sense the display hardware manipulating signal of the operating system of the mobile communication terminal 10 and may transmit a sleep signal to the control program of the computer 41, and thus the computer control program may switch the screen display unit 50 to the sleep mode as shown in the lower figure of FIG. 5.

Furthermore, the sleep signal transmitted to the control program of the computer 41 from the control program of the mobile communication terminal 10 does not need to contain specific image information, and it may be sufficient to transmit a signal for confirming the sleep mode of the display. The control program of the computer 41 receiving the sleep signal may switch the screen display unit 50 of the computer 41 to a sleep mode, and thus a computer user may correctly confirm the display state of the mobile communication terminal 10 in real-time.

Moreover, FIGS. 7 to 10 are exemplary views showing disabling the sleep mode of the mobile communication terminal 10 through the computer 41 according to an exemplary embodiment of the present invention, and details of the process are described below.

In the present invention the mobile communication terminal 10 may be controlled by a processor on the computer 41, and the sleep mode of the display of the mobile communication terminal 10 (i.e., a control target) may be controlled by manipulating the computer 41 (i.e., a control subject).

Figure 7:
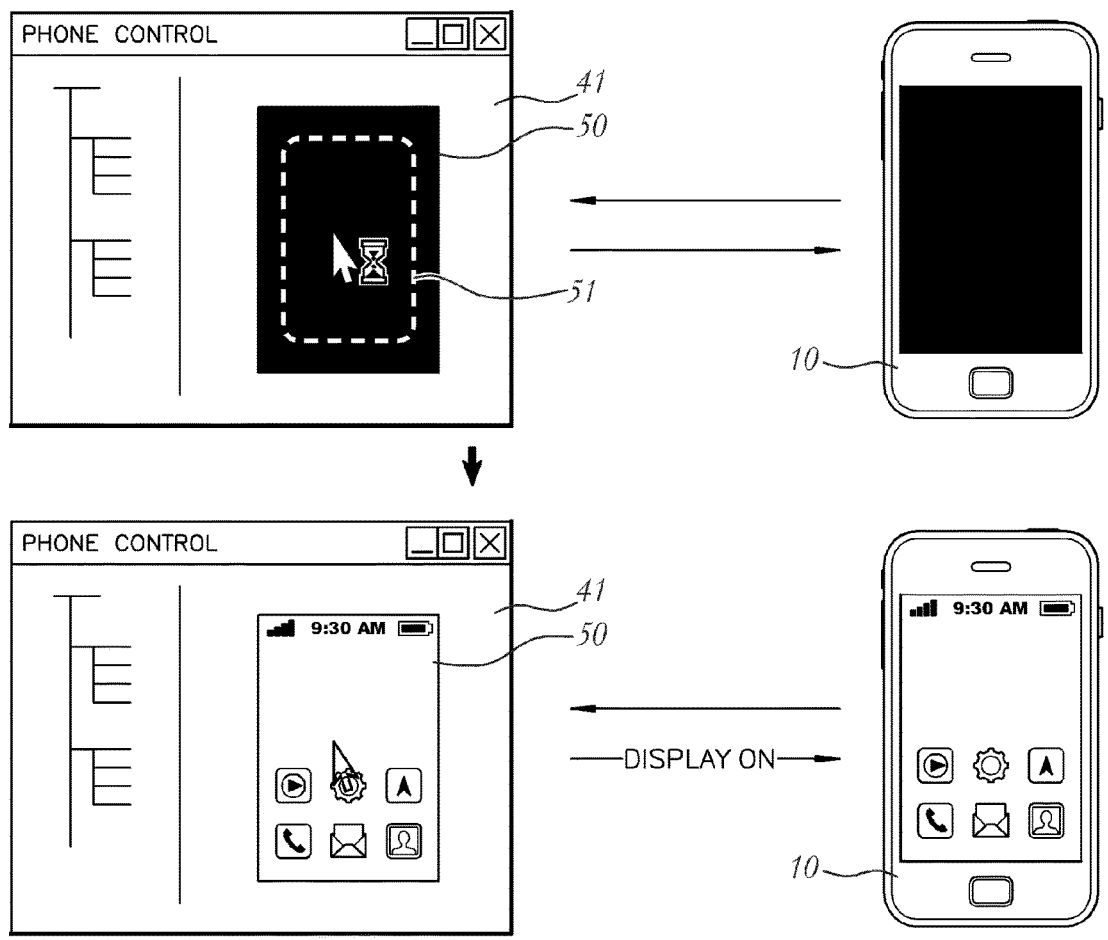
FIG. 7 is an exemplary view showing a method of releasing a sleep mode of a mobile communication terminal through a computer, according to an exemplary embodiment of the present invention.
Figure 8:
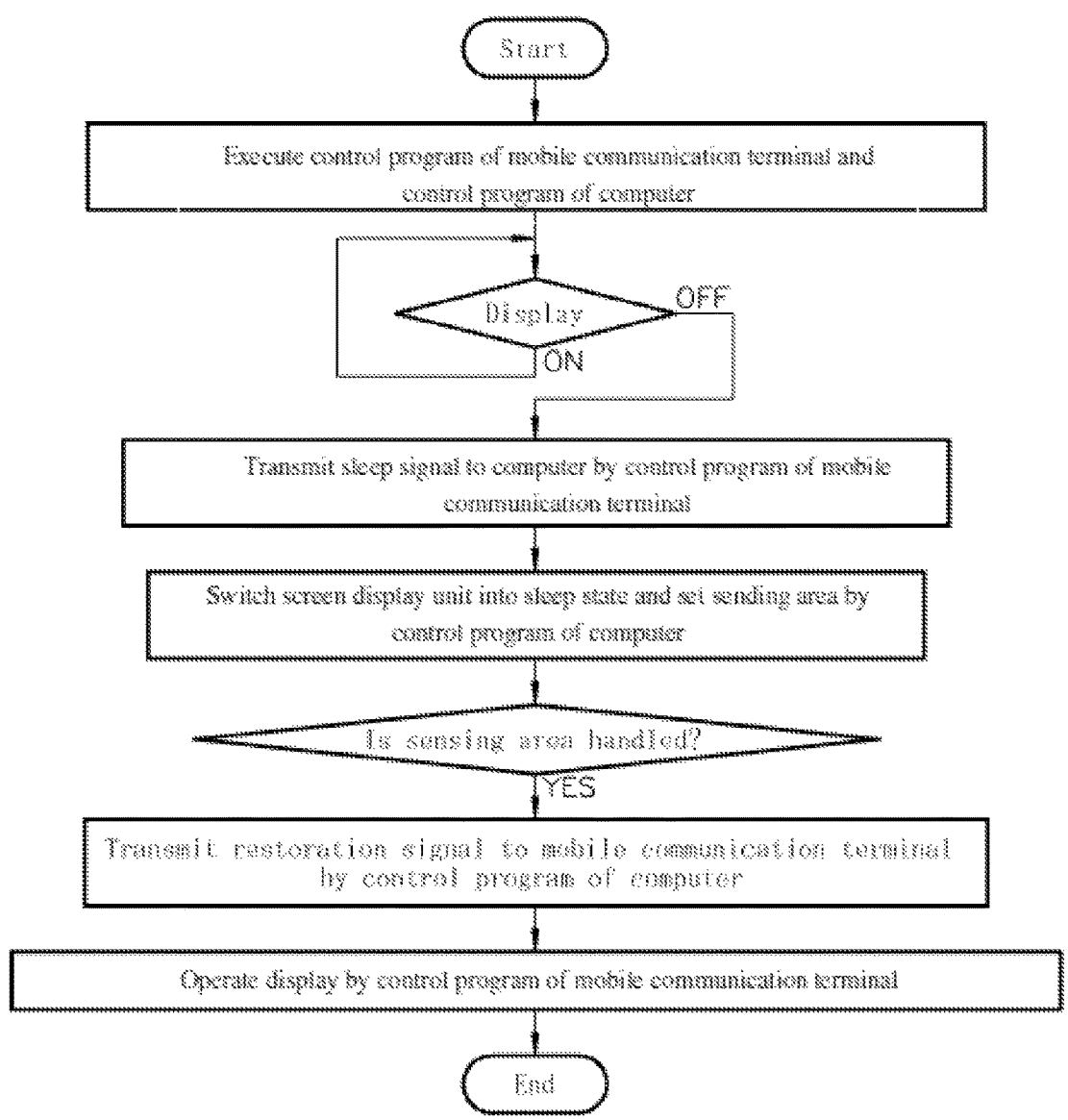
FIG. 8 is an exemplary flowchart illustrating a process of disabling a sleep mode, according to an exemplary embodiment of the present invention.

As shown in FIG. 8, the process is the same as that of FIG. 6 described above, and may further include: in response to the screen display unit 50 switching to the sleep mode, setting, by the computer control program, a sensing area 51 on the screen display unit 50 as shown in the upper figure of FIG. 7.

Figure 10:
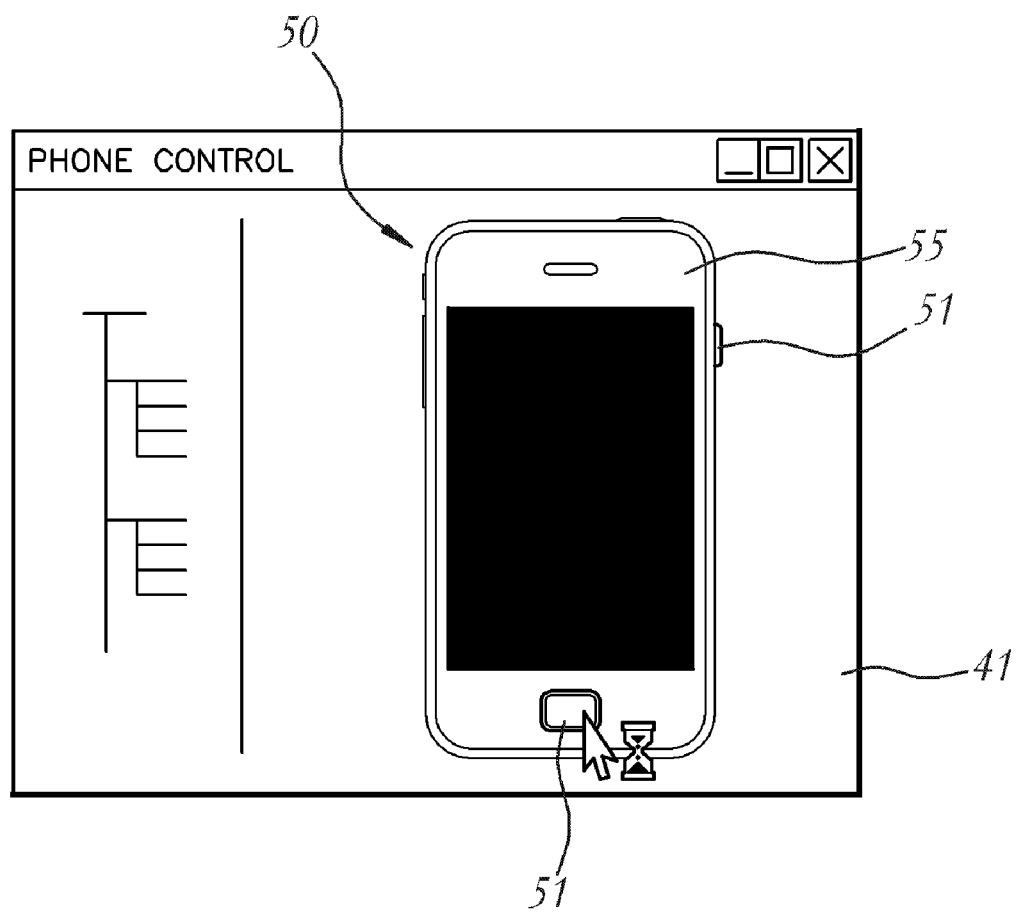
FIG. 10 is an exemplary view showing a screen display unit applying a skin, according to an exemplary embodiment of the present invention.

The sensing area 51 set on the screen display unit 50 may be an area for sensing a manipulation, such as a click, a double click, a drag or a scroll, input through an input device of the computer 41, such as a mouse or the like. The sensing area 51 may be set within the screen display unit 50 as shown in the upper figure of FIG. 7, or the entire screen display unit 50 may be set as the sensing area 51. The sensing area 51 may be an icon or a skin 55 displayed in the screen display unit 50 as shown in FIGS. 8 and 10 described below.

As shown in FIG. 7, when a manipulation is sensed in the sensing area 51 of the screen display unit 50 of the computer 41, the computer control program, executed by a processor, may transmit a restoration signal to the mobile communication terminal 10, and the mobile control program of the mobile communication terminal 10 receiving the restoration signal may input a manipulation signal into the operating system of the mobile communication terminal 10, and the display of the mobile communication terminal 10 may operate.

Since permission of the mobile control program installed on the mobile communication terminal 10 may be set to be higher than those of the other application programs in the operating system of the mobile communication terminal 10, an input the same as or similar to a hardware manipulation for disabling the sleep mode of the display of the mobile communication terminal 10 may be input through the mobile control program.

In other words, a home button at a lower portion of the mobile communication terminal 10 or a power button on a side surface of the mobile communication terminal 10 may be manipulated as a direct hardware manipulation for disabling the sleep mode of the display of the mobile communication terminal 10, and the operating system of the mobile communication terminal 10 may sense the direct hardware manipulation and may resume operation of the display. The mobile control program may input the same signal into the operating system without direct manipulating the hardware.

Figure 9:
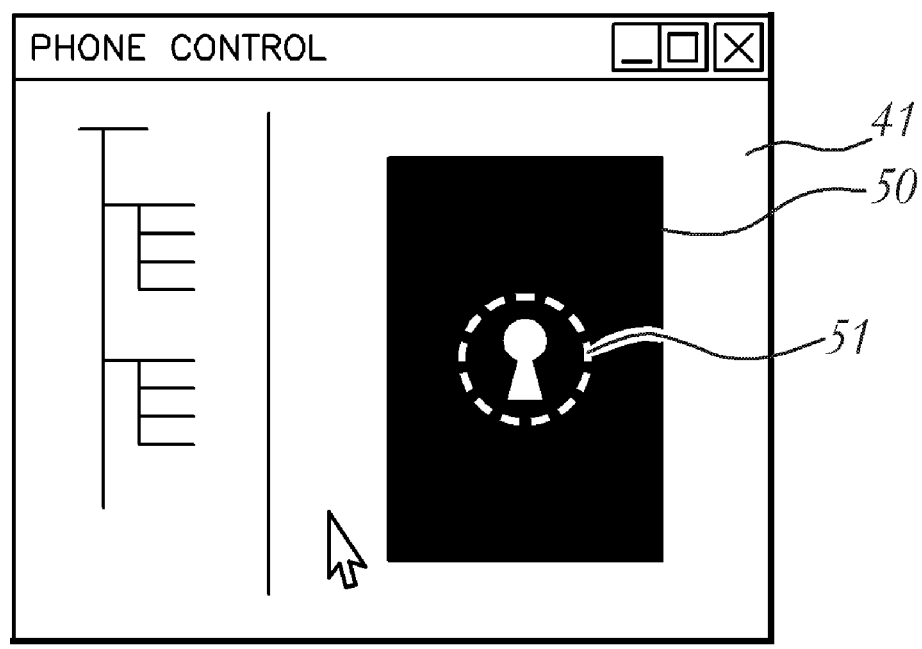
FIG. 9 is an exemplary view showing a sensing area, according to an exemplary embodiment of the present invention.

Moreover, FIGS. 9 and 10 show various exemplary embodiments of the sensing area 51 set in the screen display unit 50, and an icon displayed in the screen display unit 50 and a skin 55 implemented at the outer portion of the screen display unit 50.

The icon of FIG. 9 may be output on the screen display unit 50 by the computer control program so a computer user may recognize a manipulation method for disabling the sleep mode of the controlled mobile communication terminal 10, and a character string or the like describing the manipulation method may be displayed in addition to the icon.

The skin 55 of FIG. 10 may output an image of the outer appearance of the mobile communication terminal 10 in an outer portion of the screen display unit 50, and the computer user may operate the skin similarly to direct manipulation of the mobile communication terminal 10, thereby increasing user convenience.

When the skin 55 is included in the screen display unit 50, a home button at the lower portion of the mobile communication terminal 10 or a power button on the side surface of the skin 55 may be set as a sensing area 51 as shown in FIG. 10, and a restoration signal for disabling the sleep mode of the mobile communication terminal 10 may be transmitted by manipulating (handling) the sensing area 51 using an input device such a mouse or the like.

According to the present invention, in controlling the mobile communication terminal 10 through the processor on the computer 41, a sleep mode of the display of the mobile communication terminal 10 may be detected and controlled. Therefore, erroneous manipulation of the mobile communication terminal may be prevented in the control process, thereby increasing user convenience.

While the present invention has been described with reference to the exemplary illustrative embodiments, it is not to be restricted by the embodiments but only by the accompanying claims. It is to be appreciated that those skilled in the art can change or modify the embodiments without departing from the scope and spirit of the present invention.

What is claimed is:

1. A method of managing a plurality of screen states of a computer and a touch screen mobile communication terminal, the method comprising:

executing a mobile control program and a computer control program respectively installed on the mobile communication terminal and the computer, causing the computer to remotely control the mobile communication terminal;

establishing a session between the mobile communication terminal and the computer;

detecting, by an operating system of the mobile communication terminal, a predetermined user input at the mobile communication terminal or an absence of user input at the mobile communication terminal for a predetermined amount of time, while the computer remotely controls the mobile communication terminal;

activating, by the operating system of the mobile communication terminal, a sleep mode of the mobile communication terminal in response to the detection of the predetermined user input or the absence of user input, while the computer remotely controls the mobile communication terminal;

transmitting, by the mobile control program, a sleep signal to the computer when the operating system of the mobile communication terminal activates the sleep mode of the mobile communication terminal in response to the detection of the predetermined user input or the absence of user input, while the computer remotely controls the mobile communication terminal;

switching, by the computer control program, a screen display unit of the computer to a corresponding sleep mode in response to receiving the sleep signal at the computer from the mobile communication terminal, while the computer remotely controls the mobile communication terminal;

setting, by the computer control program, a sensing area on the screen display unit when the screen display unit is switched to the corresponding sleep mode in response to receiving the sleep signal at the computer from the mobile communication terminal, while the computer remotely controls the mobile communication terminal;

transmitting, by the computer control program, a restoration signal to the mobile communication terminal when a manipulation is sensed in the sensing area of the screen display unit; and inputting, by the mobile control program, a manipulation signal into the operating system of the mobile communication terminal in response to receipt of the restoration signal, the manipulation signal disabling the sleep mode of the mobile communication terminal.

2. The method according to claim 1, wherein the screen display unit further comprises a skin, configured to output an image of an outer appearance of the mobile communication terminal, in which the sensing area is set.

3. A system of managing a plurality of screen states, the system comprising:

a computer in which a computer control program is installed; and a touch screen mobile communication terminal in which a mobile control program is installed, wherein:

the mobile communication terminal and the computer execute the mobile control program and the computer control program respectively, causing the computer to remotely control the mobile communication terminal, a session is established between the computer and the mobile communication terminal, the mobile control program is configured to:

transmit a sleep signal to the computer when an operating system of the mobile communication terminal activates a sleep mode of the mobile communication terminal in response to detecting a predetermined user input at the mobile communication terminal or an absence of user input at the mobile communication terminal for a predetermined amount of time, while the computer remotely controls the mobile communication terminal; and input a manipulation signal into the operating system of the mobile communication terminal in response to receipt of a restoration signal, the manipulation signal disabling the sleep mode of the mobile communication terminal, and the computer control program is configured to:
- switch a screen display unit of the computer to a corresponding sleep mode in response to receiving the sleep signal at the computer from the mobile communication terminal, while the computer remotely controls the mobile communication terminal;
- set a sensing area on the screen display unit when the screen display unit is switched to the corresponding sleep mode in response to receiving the sleep signal at the computer from the mobile communication terminal, while the computer remotely controls the mobile communication terminal; and
- transmit the restoration signal to the mobile communication terminal when a manipulation is sensed in the sensing area of the screen display unit.

4. The system of claim 3, further comprising a skin disposed on the screen display unit, configured to output an image of an outer appearance of the mobile communication terminal, in which the sensing area is set.

* * * * *